US010412199B2

(12) United States Patent
Hubbard et al.

(10) Patent No.: US 10,412,199 B2
(45) Date of Patent: Sep. 10, 2019

(54) SECURE TACTICAL NETWORK

(71) Applicant: BAE Systems plc, London (GB)

(72) Inventors: Adrian Christopher Hubbard, Yeovil (GB); Paul John Michael Rallings, Yeovil (GB); Gregory William James Barton, Yeovil (GB); Christopher John Elson, Yeovil (GB)

(73) Assignee: BAE Systems plc, London (GB)

( * ) Notice: Subject to any disclaimer, the term of this patent is extended or adjusted under 35 U.S.C. 154(b) by 74 days.

(21) Appl. No.: 15/756,352

(22) PCT Filed: Jun. 28, 2016

(86) PCT No.: PCT/GB2016/051934
§ 371 (c)(1),
(2) Date: Feb. 28, 2018

(87) PCT Pub. No.: WO2017/042527
PCT Pub. Date: Mar. 16, 2017

(65) Prior Publication Data
US 2018/0248982 A1 Aug. 30, 2018

(30) Foreign Application Priority Data

Sep. 11, 2015 (EP) .................................. 15275201
Sep. 11, 2015 (GB) .................................. 1516118.5

(51) Int. Cl.
*G06F 17/30* (2006.01)
*H04L 29/06* (2006.01)
*H04L 12/24* (2006.01)

(52) U.S. Cl.
CPC ............. *H04L 69/08* (2013.01); *H04L 41/12* (2013.01); *H04L 63/302* (2013.01); *H04L 63/0815* (2013.01); *H04L 63/162* (2013.01)

(58) Field of Classification Search
CPC ....... H04L 69/08; H04L 41/12; H04L 63/302; H04L 63/162; H04L 63/0815; G06F 17/30
See application file for complete search history.

(56) References Cited

U.S. PATENT DOCUMENTS 7,747,710 B1 6/2010 Osburn, III et al.
8,670,747 B1 3/2014 Muller et al.
(Continued)

FOREIGN PATENT DOCUMENTS

WO 0277640 A2 4/2002
WO 2011133845 A2 10/2011

OTHER PUBLICATIONS

NPL-Department of the Army: "Tactics, Techniques, and Procedures (TTPs) fir the Joint Network Node Network (JNN-N)", Field Manual Interim, No. FMI 6-02.60, Sep. 5, 2008, pp. 1-145, XP007920197, Chapter 1, Chapter 2, Appendix B. (Year: 2008).*
(Continued)

*Primary Examiner* — Lan-Huong Truong
(74) *Attorney, Agent, or Firm* — Maine Cernota & Rardin

(57) ABSTRACT

A tactical network comprises a plurality of assets, at least some of the assets grouped into sub-groups. The assets within each subgroup communicate with each other using a communication protocol. The sub-groups include a first subgroup in which the assets all communicate with each using a first communication protocol and a second subgroup in which the assets all communicate with each other using a second communication protocol which is incompatible with the first communication protocol. Each subgroup is associated with a federated server. The federated server is configured to receive data from the assets, to assess the data to identify significant changes, to convert the significant changes in the data into a common format, compatible with all federated servers in the tactical network, and to transmit, (Continued)

in the common format, to the federated server of another of the subgroups, the significant changes.

27 Claims, 7 Drawing Sheets

(56) References Cited

U.S. PATENT DOCUMENTS

| | | | |
|---|---|---|---|
| 2005/0099995 A1 | 5/2005 | Blossom et al. | |
| 2009/0150548 A1* | 6/2009 | Smith | H04L 41/0893 709/226 |
| 2011/0047230 A1* | 2/2011 | McGee | H04L 41/0609 709/206 |
| 2011/0103393 A1 | 5/2011 | Meier et al. | |
| 2013/0022202 A1 | 1/2013 | Stroud | |
| 2014/0337134 A1* | 11/2014 | Bugenhagen | G06Q 10/087 705/14.57 |
| 2016/0056975 A1* | 2/2016 | Marin | H04L 67/10 709/220 |
| 2016/0219114 A1* | 7/2016 | Keyani | H04W 4/21 |

OTHER PUBLICATIONS

International Search Report and Written Opinion of Appl No. PCT/GB2016-051934 dated Mar. 13, 2018, 7 pages.
International Search Report and Written Opinion of Internatioanl Application No. PCT/GB2016/051934, dated Sep. 14, 2016, 12 pages.
Department of the Army: "Tactics, Techniques, and Procedures (TTPs) fir the Joint Network Node-Network (JNN-N)", Field Manual Interim, No. FMI 6-02.60, Sep. 5, 2008, pp. 1-145, XP007920197, Chapter 1, Chapter 2, Appendix B.
Search Report Under Section 17(5) of Great Britain Application No. GB1516118.5, dated Apr. 27, 2016, 4 pages.
Extended European Search Report of European Application No. EP15275201, dated Mar. 2, 2016, 9 pages.

* cited by examiner

SECURE TACTICAL NETWORK

RELATED APPLICATIONS

This application is a national phase application filed under 35 USC § 371 of PCT Application No. PCT/GB2016/051934 with an International filing date of Jun. 28, 2016 which claims priority of GB Patent Application 1516118.5 filed Sep. 11, 2015 and EP Patent Application 15275201.0 filed Sep. 11, 2015. Each of these applications is herein incorporated by reference in its entirety for all purposes.

FIELD OF THE INVENTION

This invention relates to the field of tactical networks, that is encrypted military networks including tactical data links (TDLs), that is data links primarily between military assets.

BACKGROUND OF THE INVENTION

Until quite recently, tactical data links were limited to large platforms such as aircraft, large boats and large land vehicles. However, terminals are becoming smaller and lighter, with reduced power and cooling requirements. Tactical data links are now being utilized by an increasing number of operators across a wide variety of combat roles and responsibilities.

Despite this proliferation of users, many tactical networks are effectively "stove-piped", with only limited and intermittent direct information exchange between networks. Military operators, in both the deployed ("in the field") and non-deployed ("back at base") operational space, have access to a plethora of information, tactical networks and data sources, each with its own characteristics, content and user community.

It would be desirable to provide a common protocol for tactical data. Providing a single common network for all military assets offers the potential for improving the command and control of assets (enabling changes in tactical doctrine), the reduction of the chain of command between a commander and the ultimate subject of his orders (kill chain), and a significant improvement in the identification of friendly forces and their interactions, providing a clearer tactical picture. However, sharing of information between these networks and user communities, to create a single information infrastructure covering both the deployed and non-deployed environment, has been a challenge and has until now proven to be impractical. Implementing new, bespoke, data bearers across all units in a nation's (or even multinational alliance's) armed forces would be a mammoth task, and even modifying existing data link platforms to provide more compatibility would be very difficult. Moreover, tactical networks typically include low-bandwidth data connections, for example via satellites, making sharing of data between many assets on different TDLs unfeasible using conventional systems.

It would be advantageous to provide a tactical network in which one or more of the aforementioned disadvantages is eliminated or at least reduced.

SUMMARY OF THE INVENTION

Briefly and in general terms, the present invention provides apparatus directed towards improving information exchange in tactical networks, in particular tactical networks including tactical data links that are incompatible with each other.

A first aspect of the invention provides a tactical network having the features set out in claim 1 below.

A second aspect of the invention provides a method of communicating in a tactical network, the method having the features set out in claim 27 below.

Preferred but optional features of the invention are set out in the dependent claims.

BRIEF DESCRIPTION OF THE DRAWINGS

Example embodiments of the invention will now be described by way of example only and with reference to the accompanying drawings, of which.

For convenience and economy, the same reference numerals are used in different figures to label identical or similar elements of the systems shown.

DETAILED DESCRIPTION

Figure 1:
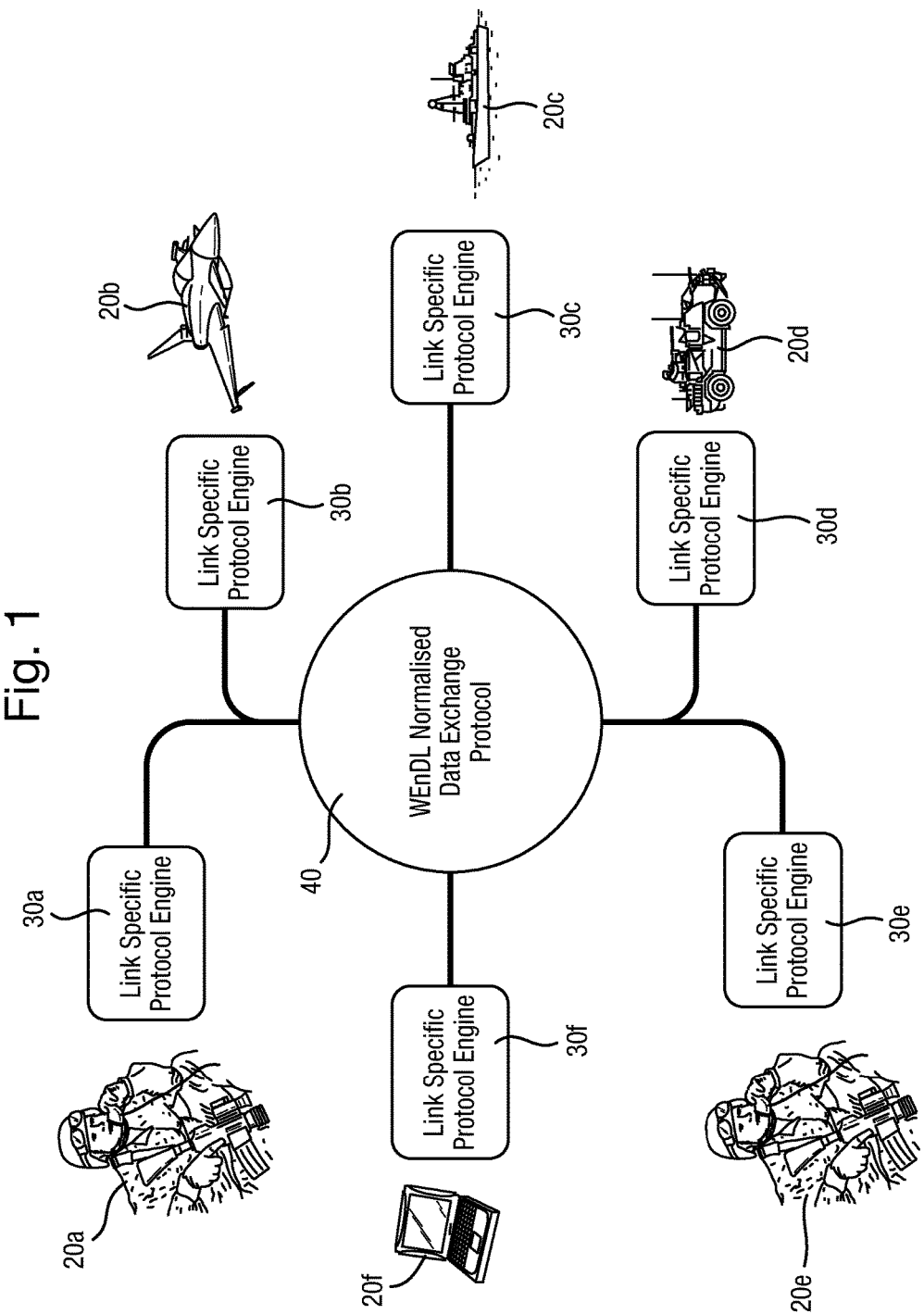
FIG. 1 is a schematic of a tactical network, showing exchange of data across incompatible data links using a normalised data protocol.

Embodiments are described herein in the context of approaches to improve the performance of tactical networks.

Those of ordinary skill in the art will realize that the following detailed description is illustrative only and is not intended to be in any way limiting. Other embodiments of the present invention will readily suggest themselves to such skilled persons having the benefit of this disclosure. Reference will be made in detail to implementations as illustrated in the accompanying drawings. The same reference indicators will be used throughout the drawings and the following detailed description to refer to the same or like parts.

As previously stated, the first aspect is directed to a first aspect of the invention provides a tactical network comprising a plurality of assets, at least some of the assets grouped into sub-groups, the assets within each sub-group communicating with each other using a communication protocol, the sub-groups including a first sub-group in which the assets all communicate with each using a first communication protocol and a second sub-group in which the assets all communicate with each other using a second communication protocol which is incompatible with the first communication protocol, each sub-group being associated with a federated server, each federated server being configured to receive data from the assets, to assess the data to identify significant changes, to convert the significant changes in the data into a format common to all federated servers in the tactical network, and to transmit, in the common format, to the federated server of another of the sub-groups, the significant changes.

Of course, the other federated server will receive the significant changes, in the common format, convert the significant changes into the communication protocol of its associated sub-group, and transmit the data to recipient asset(s) in its sub-group.

As previously stated, a second aspect of the invention provides a method of communicating in a tactical network comprising an asset in a first sub-group of the network communicating with an asset in a second sub-group of the network, wherein all the assets in the first sub-group communicate with each using a first communication protocol and all the assets in the second sub-group communicate with each other using a second communication protocol which is incompatible with the first communication protocol, wherein the asset in the first sub-group transmits data to a federated server associated with the first subgroup, the federated server assesses the data to identify significant changes, converts the significant changes in the data into a format common to all federated servers in the tactical network, and transmits the significant changes, in the common format, to the federated server of the second sub-group.

The method may also include the steps of the other federated server receiving the significant changes, in the common format, converting the significant changes into the communication protocol of its associated sub-group, and transmitting the data to the asset in the second sub-group.

Thus, the invention enables incompatible tactical networks to communicate with each other using their own native network protocols, by converting native messages from the tactical data link into a normalized protocol internal to the tactical network. The normalized message is then routed to the appropriate recipient and converted back into the native form applicable to the tactical data link of that participant.

The tactical network may be, for example, a network certified to handle data classified as SECRET by government organisations, or sufficiently strongly encrypted to be so certified.

As used herein, a change is "significant" if it is (i) a change in a category predetermined to be significant (for example issuance of command data may always be a significant change) or (ii) a change in the status of an asset and the change is resolvable within the communication protocol of the subgroup to which the change is to be transmitted. For example, assets communicating with each other using an example low-fidelity tactical data link A will work with a resolution of 100 ft, so a change of less than 100 ft in the position of an asset is not generally perceivable by a user of link A, and hence is not transmitted to assets in a subgroup communicating with each other using link A. Assets communicating with each other using an example high-fidelity tactical data link B, on the other hand, will work with a resolution of 10 ft, and so a change of less than 100 ft but more than 10 ft in the position of an asset will be perceived by a user of link B and hence is transmitted to assets in a subgroup communicating with each other using link B. Another example of a change in status that has different resolution in different networks is turn rate.

In the case of a change in the status of an asset, the assessment of data to identify significant changes may include the steps of: comparing the data from the asset(s) to previously received data; identifying changes between the previously received data and the data from the asset(s); comparing the changes to a predetermined threshold for a change to be significant, and deciding whether the change is or is not significant according to the predetermined threshold. It may be that different significance thresholds are stored for different asset parameters. It may be that different significance thresholds are stored for the same asset parameter in different sub-groups.

The common format into which the significant changes are converted may be a message format and a corresponding communication protocol.

The significant changes may be transmitted to the federated server of the other of the subgroups over an internet protocol (IP) network.

The significant changes may be transmitted to the federated server of the other of the subgroups at an update rate that is varied in response to changes in the bandwidth of a link between the federated servers.

The assets may be military personnel. The assets may be military vehicles or other equipment. The military vehicles may include land vehicles, naval vehicles and air vehicles. The land vehicles may include armoured land vehicles. The naval vehicles may include ships. The air vehicles may include manned aircraft.

In at least one of the sub-groups, the assets may be first responder personnel (e.g. police, fire, ambulance or coastguard personnel) and/or first responder vehicles or other equipment.

The network can include assets at fixed or moving locations.

The sub-groups include one or more subgroups in which the communication protocol is a tactical data link protocol. The sub-groups may include at least one subgroup in which the communication protocol is Link 11. The sub-groups may include at least one sub-group in which the communication protocol is Link 16.

The sub-groups may include at least one sub-group in which the communication protocol is Link 22. The sub-groups may include at least one sub-group in which the communication protocol is the Variable Message Format (VMF) protocol. The sub-groups may include at least one sub-group in which the communication protocol is the Air Force Application Protocol Development (AFPD) protocol. The sub-groups may include at least one sub-group in which the communication protocol is GPS IP. The sub-groups may include at least one sub-group in which the communication protocol is the Blue Force network protocol.

The sub-groups may include at least one sub-group in which the communication protocol is Internet Protocol; i.e. the sub-group is an IP network. The assets in the IP sub-group may include at least one user accessing the IP network using a web browser. Thus, advantageously, in example embodiments of the invention, web users are able to participate in tactical data link networks.

The federated server may include a web server. The web server may provide web browser scripts that produce a web-based display to any web browser enabled workstation attached to the wide area network.

It may be that assets have different permissions levels within the secure network, for example being able to see data or able to send commands. For example, it may be that web users can be allocated one or more of the following permissions: available data is presented to an operator for visualisation only; full authority to see data and to interact with the data source and inject information back out into the data link; third party application interface rights allowing an approved software application to access network information and account capabilities; or able to perform low-level interactions involved with the specific setting up and enabling of network interface equipment.

The federated servers may communicate with each other using a link that has a limited bandwidth. The skilled person will understand that a link is considered to have a limited bandwidth when it is significantly smaller than the bandwidth of a wired connection. For example, the limited bandwidth may be a bandwidth of less than 100 Mbits/second, less than 50 Mbits/second, or less than 20 Mbits/sec. For example, the bandwidth of a typical tactical satellite link may be as low as 12 Mbits/second.

The federated servers may communicate with each other using a satellite link, for example a tactical satellite link. The federated servers may communicate with each other using a single channel of a tactical satellite link. For example, the TACSAT military standard MIL-STD-188-181 specifies operation in the UHF Band between 225 and 400 MHZ with twenty-one 5 KHz channels and seventeen 25 KHz channels. The federated servers may communicate using one of the 25 Khz channels (which provides about 12 to 16 Mbits/s of data bandwidth).

It may be that two or more of the sub-groups are associated with a single federated server. At least one, or all, of the federated servers may each be associated with two or more different sub-groups that communicate using different communication protocols from each other.

The data received by the federated server may be data relating to the status of the assets in the subgroup. The data received by the federated server may be commands issued by or from an asset in the subgroup and directed at an asset in the other subgroup.

The federated server may include or be associated with a combat ID server, that is a server that stores the identities and locations of assets within the network.

Advantageously, via the federated servers, the information stored within the combat ID servers can be accessed by all users of the network, in the native format of their local network (e.g. tactical data link format or web display).

It may be that the federated servers provide information services to which assets can subscribe.

It may be that none of the federated servers is a central server, i.e. a server that controls all of the others.

The data may be voice data. Thus, voice data may be passed between different tactical data links and/or between a tactical data link and an IP network. That may enable transmission of voice commands between a voice radio with a specific configuration (e.g. a specific waveform, frequency or function) and a different voice radio with a different configuration.

The subgroups may be sub-networks capable of operating independently; thus, for example, embodiments of the invention may utilise existing technology and capability of existing tactical data links.

A plurality of the subgroups may be linked to form a node of the tactical network. The subgroups in the node may be linked in a local area network (LAN). The LAN may be an IP LAN. The LAN may include subgroup remote access points, which are tactical data link to LAN interface units, which enable the subgroups to exchange data with the LAN.

The LAN may include the federated server with which the subgroups of the node are associated. The federated server may communicate with the assets within the LAN over a higher-bandwidth connection than a wide area network (WAN) connection over which it communicates with other federated servers.

Thus, within the LAN, the subgroup remote access point and federated server may communicate using a protocol optimised for performance, whereas federated servers in different nodes communicate using a protocol optimised to minimise traffic flow between nodes.

The federated servers may provide data routing, account management, web login and/or other functions.

The federated servers may comprise a personal-computer-based server unit.

It may be that the federated servers each maintain a local copy of a common database, and exchange data relating to changes in the content of that database.

The federated servers may apply specific geographic area filters whereby only information relevant to a specific geographical area requested by accounts logged into a specific federated database is requested from the various producer databases. The federated servers may prioritise messages, for example to support physical command response mechanisms.

The federated server may be configured to provide combined situation awareness and command-and-control capability from data received from the sub-groups.

The federated server may act as a command and control unit on the node(s) to which it belongs. The federated server may act as a command and control unit on the node(s) to which it belongs even when not connected to other federated servers. The LAN may include a federation adapter, being a software component responsible for exchange of data with other federated servers. The subgroup remote access point may include a physical TDL interface unit for providing an appropriate physical link to a particular TDL. The LAN may include a data link processor, being a controller, for example in software, which manages physical control of and data exchanges with the attached TDL via the physical TDL interface unit. Thus, the data link processor may be responsible for one or more or all of the following: the configuration, setup and management of the physical TDL interface unit; the correct interpretation of any data link protocol and transmission rules; packing and unpacking data into message formats appropriate for the attached TDL; and ensuring that the federated server interfaces to the attached TDL correctly and obeys the rules of the individual TDL.

The data link processor may in turn pass information to and from the federated server, which in turn distributes the information over the secure IP network.

It may be that the data link processor also receives location information from a Global Positioning System unit.

The federated server may include a data link processor adapter (DLP-A) which converts data from the data link processor and into the common format used in communications between federated servers. The DLP-A may also convert data received in the common format into the TDL-specific format.

The federated server may include a multi-link gateway. It may be that a multilink gateway is connected to a plurality of TDLs. There may be a datalink processor adapter for each TDL. Communication between the multilink gateway adapter and the datalink processor adapter may be in the common format.

The multilink gateway may create a database of all information received by the federated server.

The multilink gateway may generate a situational awareness picture of all of the information it receives, both information received from data link processor(s) to which it is connected locally, and information received from remote subgroups.

In the event of loss of connectivity to other Federated Nodes, the database may continue to operate stand-alone using locally sourced information.

The multilink gateway may process the data received by the federated server according to forwarding rules.

The federated server may include a federation adapter, which creates a routing table for message transport between federation adapters or for messages from an asset in one subgroup to an asset in another subgroup.

The federation adapter may carry out IP network compression and optimisation algorithms on data transmissions between federation adapters, for example at the IP Protocol level. The federation adapter may carry out information compression algorithms at the normalised data level to ensure only the minimum information necessary is transmitted between federated servers. The federation adapter may carry out correlation to ensure federated servers seeing the same data link entities don't duplicate reports. The federation adapter may carry out direct command and control messaging to local and remotely connected assets, preferably without applying filtering or compression.

The filtering may be done in addition to the information compression at the normalised data level. For example, the filtering may select the information being transmitted, on the basis of one or more of the update rate of the destination (e.g. for non-critical information), the preferences of the source node (e.g. selections made by the operator), the geographic area, or the prevailing status (hostility, surface, subsurface, air etc.).

The multi-link gateway may also connect to a web adapter, which provides a web browser interface for local web users. The web adapter may also retrieve map data from a map database and provides it to the local web users. It may be that the users can also elect to receive information from other remote sub-groups, which is then retrieved via the Federation Adapter and supplements the local data base.

It may be that users can use a single log-on identity but appear as operational units in a plurality of sub-groups simultaneously. The federated server may be configured to enable a user to simultaneously appear in different data link types or in physically isolated parts of the same network, e.g. where line-of-sight issues cause the assets to loose connectivity within a single sub-group. For example, data from a plurality of interface units may be fused and correlated in software into a single virtual access point to the tactical network.

It will be appreciated that features described in relation to one aspect of the present invention can be incorporated into other aspects of the present invention. For example, an apparatus of the invention can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

Example embodiments of the invention comprise a set of software and hardware components which allow information from disparate TDL networks and protocols to be normalised, compressed, routed, translated and re-transmitted into a different TDL format. The challenges of augmenting Dynamic Tactical Data Exchange are addressed by the use of secure wide area networks together with existing technology and capability in order to maximize the effectiveness of fielded TDLs and thereby extend the capability of current in service and future TDLs. The system enables multiple operators to connect to multiple TDL sources over a secure IP network, thereby removing any physical line-of-sight issues and the current "One Operator+One Terminal=One Network" constraints encountered today.

Cross datalink information exchange based on normalized IP traffic (FIG. 1) enables key participants (soldier 20*a*, aircraft 20*b*, ship 20*c*, armoured vehicle 20*d*, soldier 20*e*, laptop user 20*f*) in any of the attached networks to communicate to each other using their own native network protocols. A link-specific protocol engine turns DataLink-specific messages into a normalized internal protocol 40. The normalized message is then routed to the appropriate recipient and converted back into the DataLink protocol applicable to that participant. That results in each platform 20*a-f* being able to exchange information without the need to update existing or implement new protocols locally; it also allows for exchanges between standard voice over IP protocols and TDL-specific voice protocols e.g. soldier voice to Link 16 voice. In addition a Voice radio with a specific configuration (e.g. waveform, frequency or function can talk to a different Voice radio with a different configuration).

An example secure network comprises both hardware and software components, the hardware including tactical data link remote access points (TRAPs), federated server nodes (FSNs) and a secure IP network bearer (typically a legacy system). The software running on the TRAPs and federated servers will depend on required capabilities.

As well as enabling tactical data links to talk to each other, this example system provides four account types for web users:

Situational Awareness or Read Only account where available data is presented to an operator for visualisation only;

Command & Control Account where the operator has the full authority to see data but to interact with the data source and inject information back out into the data link;

Third party application interface allowing an approved software application to access network information and account capabilities; and Network Management Account where the operator is able to perform low-level interactions involved with the specific setting up and enabling of network interface equipment.

Users of the system log into a federated servers via account mechanisms allowing them different privileges according to their role and security clearances. The example system provides an IP-based capability allowing users in fixed locations, on deployment, or on moving platforms to share tactical data. Any operator who has access to the secure IP network, wherever geographically located, can access and interact with any of the Data Sources connected to the federated servers. Users can access the system via an Internet Browser from a standard PC connected to a suitable IP Network. This example embodiment thus provides what is in effect a single wide area information infrastructure wherein disparate Tactical Data Links and non-traditional data link operators/platforms interact with each other in a single information environment.

Figure 2:
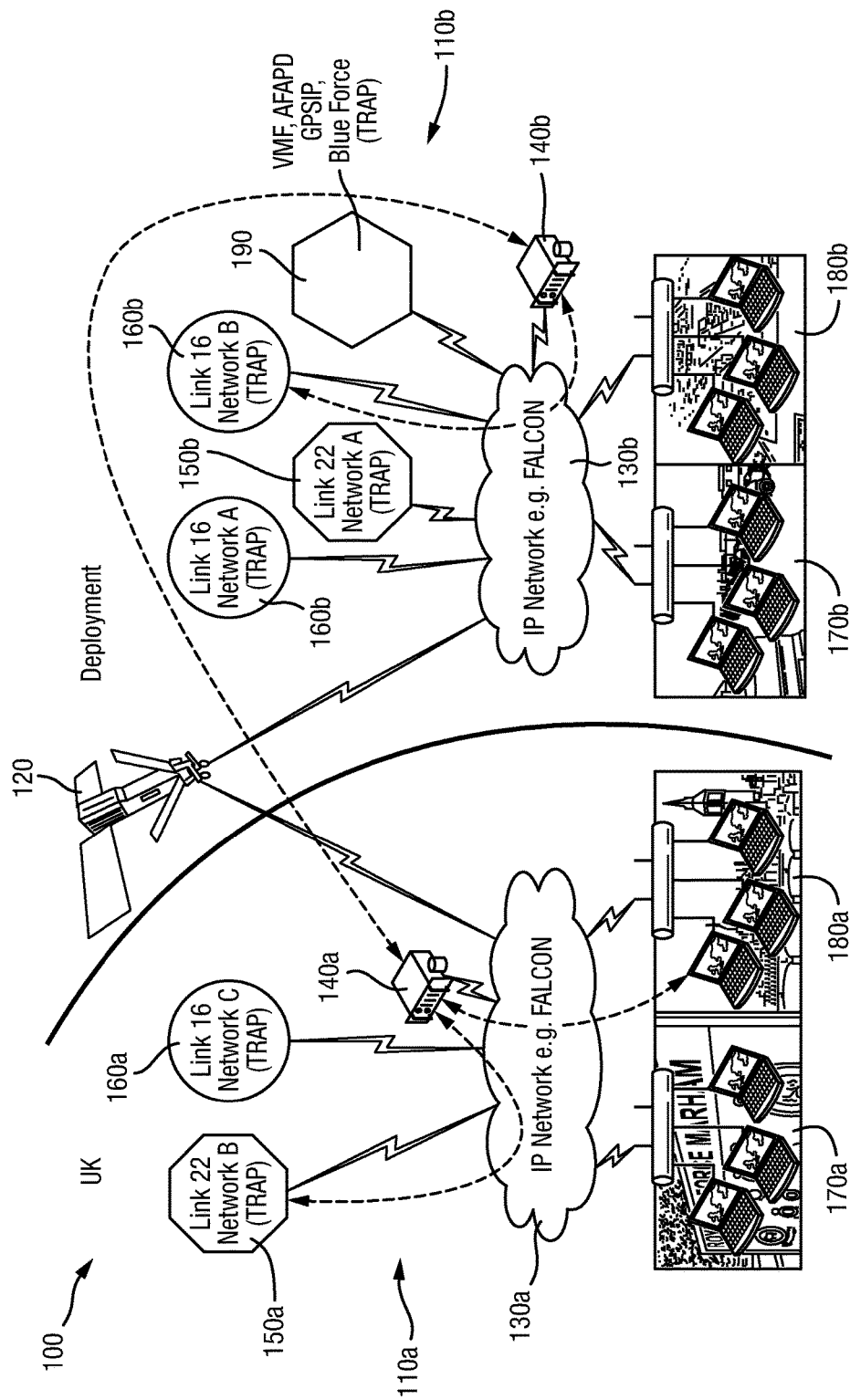
FIG. 2 is another schematic of a tactical network, showing two example nodes of the network.

In an example embodiment (FIG. 2), a secure wide-area network 100 includes two sub-networks, one in the UK (subnet 110*a*), and one on deployment (subnet 110*b*), which communicate with each other via a satellite 120. Each sub-network 110*a*, 110*b* includes an IP network 130*a,b*, which connects directly to the satellite 120. Each subnetwork also includes a federated server 140*a,b*.

The first subnetwork 110a includes a Link 22 data link network 150a and a Link 16 data link network 160a, and web users at two locations 170a, 180a. The second subnetwork 110b includes a Link 22 data link network 150b, two Link 16 data link networks 160b, a VMF, AFAPD, GPS IP, Blue Force network 190, and web users at two further locations 170b, 180b.

The federated server 140a of the first subnetwork 110a receives data from the Link 22 network 150a and the Link 16 network 160a, the data comprising commands and information relating to the status of assets in and associated with each network 150a, 160a. The federated server 140a stores processes that information, and stores and transmits any changes to the information that have occurred since information was last stored. The changes are transmitted, via the satellite 120, to the federated server 140b of the second subnetwork 110b. Both federated servers transmit the changes to any participants of their subnetwork 110a, b who needs to receive it.

For example (dashed lines in FIG. 2), data relating to the position of an asset in the Link 22 network 150a of the first subnet 110a is transmitted to the IP network 130a which passes it on to the first federated server 140a. The first federated server 140a determines that the position of the asset has changed, and transmits the change to the second federated server 140b. The first federated server 140a also transmits the information to a web user at location 180a, who has asked to be informed about the Link 22 network 150a. The second federated server 140b transmits the change to the Link 16 network 160b.

Figure 3:
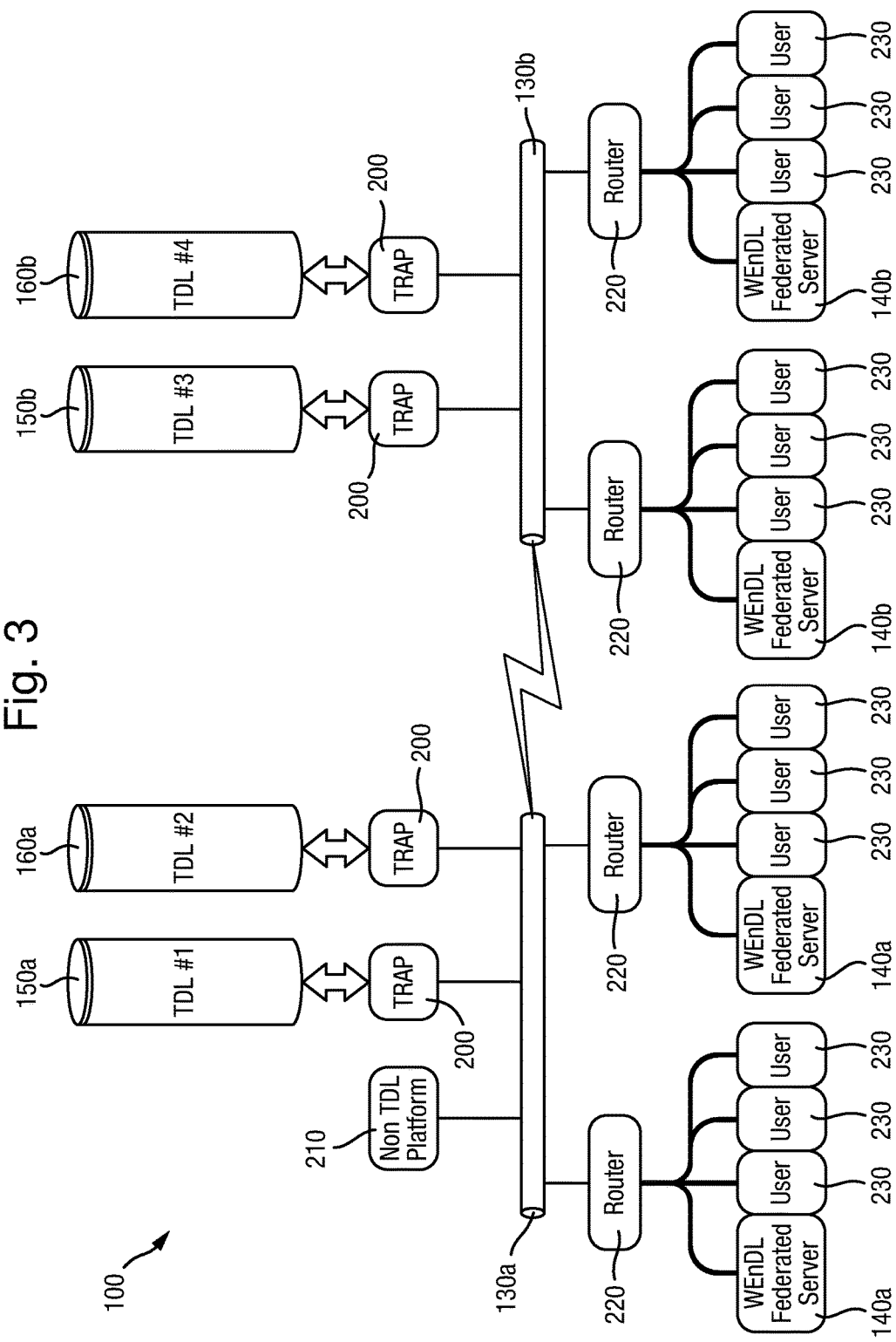
FIG. 3 is another schematic of the tactical network of FIG. 2, showing physical connections of the within the network.

In order to achieve this connectivity between different TDLs 150a,b, 160a,b, 190 and also web users, the system 100 includes TDL to IP interface units (referred to as TDL Remote Access Point (TRAP) units) 200, which enable the TDLs 150a,b, 160a,b, 190 to exchange data with the secure IP networks 130a,b (FIG. 3). Multiple TRAP units 200 are positioned around the secure IP networks 130a, 130b to provide the required IP to TDL interactions. The exact number of TRAP units 200 provided depends on line-of-sight issues, as discussed further below, and the number of different TDL types to be connected. In the example of FIG. 3, the secure IP network 130a is connected to a tactical data link 150a via a TRAP 200 and to a second tactical data link 150b via a second TRAP 200. A non-TDL 210 is also connected to the IP network 130a. A first set of web users 230 and a first federated server are connected to the secure IP network 130a via a first router 220. A second set of web users 230 and a second federated server are connected to the secure IP network 130b via a second router 220. The second IP network 130b is set up similarly, with connection to TDL networks 150b, 160b via TRAPs 200, a first set of web users 230 and a first federated server connected to the secure IP network 130a via a first router 220, and a second set of web users 230 and a second federated server connected to the secure IP network 130b via a second router 220.

The federated servers 140a, 140b connect to the TRAP units 200 on their local network and provide data routing, account management, web login and other functions.

The network 100 enables individual "stove piped" TDLs 150a,b, 160a,b to exchange information, between each other, with non-Tactical Data link entities (platforms which do not have a traditional data link but which can access the IP network), and with operators using standard off the shelf web browsing tools.

At the physical level, in this example the federated servers each comprise a personal-computer-based server unit scaled according to the number of simultaneous users requiring active logins. The secure network will typically comprise hard-wired Local Area Networks (LAN) interconnected by a Wide Area Network (WAN) comprising both copper and RF elements.

The system is optimised to minimise the traffic flow over the WAN elements of the network whilst maintaining the performance for the operators over the LAN elements. The federated servers effectively create a single common database, accessible locally via Web Browser, and communicate with each other to ensure that each federated database is kept updated. Federated servers are located where multiple operators are grouped together and have a local infrastructure able to support wider-bandwidth data transfer. The federated servers operate to reduce the traffic passing over the Wide Area Network. Data exchange between Federated servers is minimised in this example by: transmitting only changing information, employing data pull techniques, whereby only data requested by the accounts logged into a specific federated database is requested from the various producer databases; by applying specific geographic area filters whereby only information relevant to a specific geographical area requested by accounts logged into a specific federated database is requested from the various producer databases; and by prioritising messages, for example to support physical command response mechanisms.

A TRAP provides the physical and logical interface between any native TDL and the secure IP WAN. The number of TRAP units required will depend on the number and nature of the TDL Networks to be interfaced. Each TRAP not only provides the physical interface between the Tactical Data Link and the Secure IP WAN but also hosts the software necessary to manage the TRAP functionality. In this example, each TRAP has been designed such that links can be added to provide full tactical connectivity to current and future data links such as but not limited to Link16, Link11, STDL, IDM-AFAPD, VMF and Link22.

The federated server receives data from the TRAP units and provides combined situation awareness and command and control capability. A web server is included as part of the services of the federated server and provides web browser scripts that produce a web-based display (SA, free text, and commands) to any web browser enabled workstation attached to the wide area network.

When necessary the deployed TDL service can be run in isolation from the federated server service to initialise the TDL equipment and act as a command and control unit on the network(s) to which it is attached.

The TRAP nodes communicate over existing IP infrastructure, e.g. a wired system or RF links. In this example, the Federation Adapter is the federated server software component responsible for exchange of data with other TAP Nodes. The WEnDL architecture assumes that the link between the TAPs is not reliable.

On the distributed link minimising bandwidth use has in this example been given priority over performance to allow the system to work over narrow bandwidth tactical equipment.

An example TRAP includes a set of adapters that are suitable for the specific role of the TRAP, together with a multilink gateway (MLG) application that coordinates and controls the other adapters. The physical machines are connected with an Ethernet connection and this is the mechanism used to communicate between the adapters. (On the internal link performance is given a higher priority than bandwidth as the wired infrastructure provides a high bandwidth pipe.)

Figure 4:
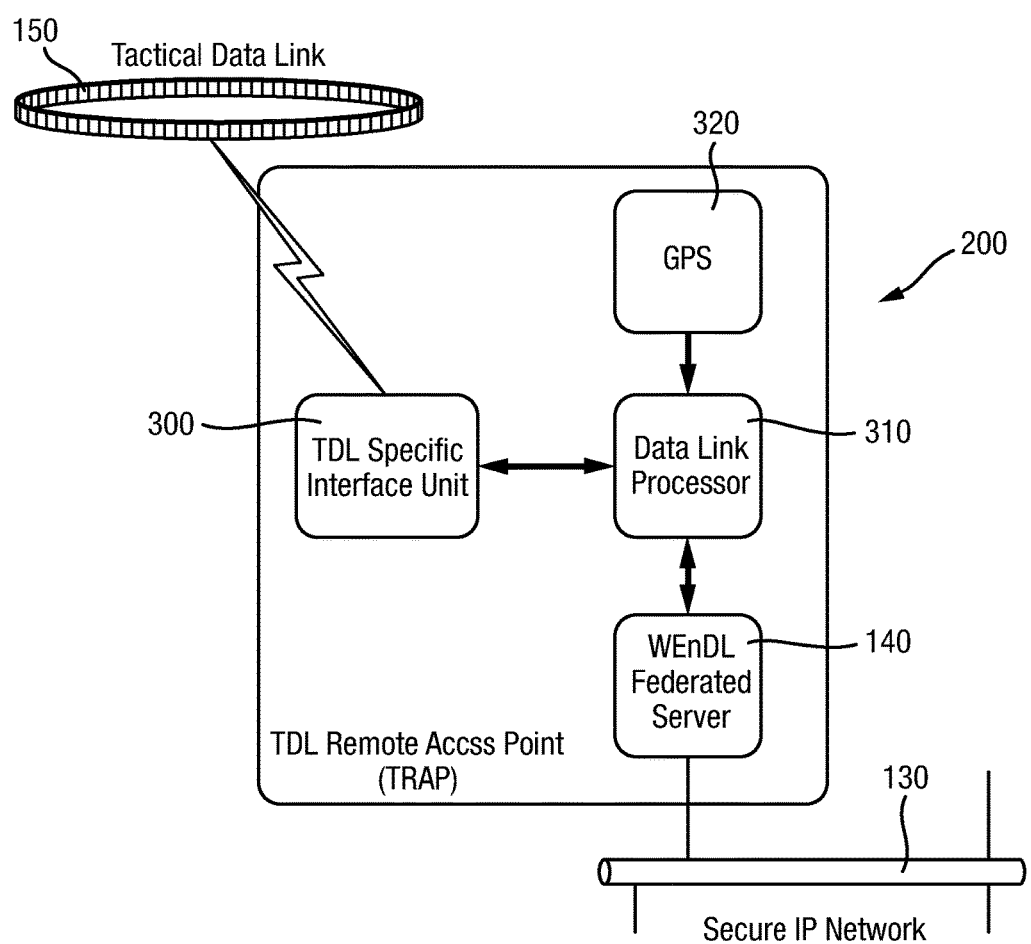
FIG. 4 is a schematic showing in more detail a tactical data link remote access point from the nodes of FIG. 3, showing connectivity between the TDL and the LAN.

An example TRAP 200 is shown in further schematic detail in FIG. 4. As described above, the TRAP 200 provides a link between a tactical data link 150 and a secure IP network 130. The TRAP 200 includes a TDL-specific interface unit 300 which provides an appropriate physical link to the particular TDL 150. Data to and from the TDL 150 passes through the interface unit to a data link processor 310. The data link processor also receives, in this example, location information from a Global Positioning System unit 320. The data link processor 310 passes information to and from the federated server 140, which in turn distributes information over the secure IP network 130, as discussed above.

Figure 5:
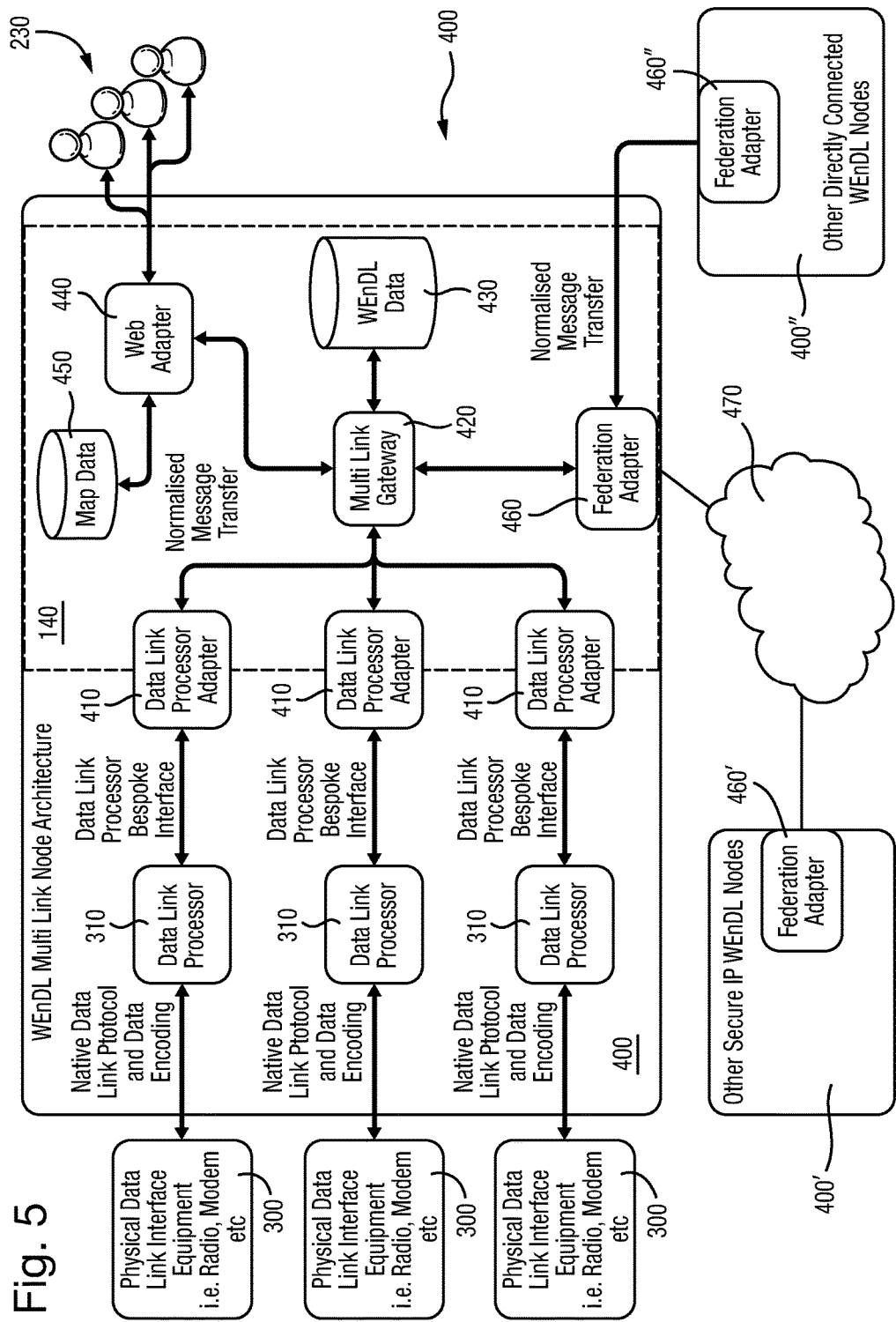
FIG. 5 is a schematic showing in more detail the architecture of a multilink node in the nodes of FIGS. 2 and 3, showing connectivity within the node.

In an example embodiment of a deployed node 400 of the system (FIG. 5), more than one TDL is connected to a single multi-link gateway 420. Each TDL is connected to its own dedicated physical data link interface equipment 300, which, on the one hand, provides a physical interface appropriate for physical connection of the TDL and, on the other hand, is connected to a data link processor 310 of the node 400. For example if the interface is to be Link 16, the physical data link equipment 300 will be a Link 16 Terminal and associated RF interface equipment, whereas if the TDL to be connected is an ADS-B terminal then a simple ADS-B transceiver will be sufficient. In this embodiment, one data link processor 310 is provided for each TDL. Data flowing between the physical data link equipment 300 and the data link processor 310 retains the native format, protocols and encoding of the TDL.

Where the interface is to a networked source (for example the physical interface is via an IP network, for example Joint Range Extension Protocol), there is no need for a physical interface component and the Data Link Processor 310 connects directly to a network feed.

The number of TDLs connected in a given embodiment and their types is dependent on the information sources available.

The Data Link Processor (DLP) 310 is a software component which manages the physical control and data exchanges with the attached TDL via the physical data link interface equipment 300. The DLP is responsible for: the configuration, setup and management of the physical interface equipment 300 (where appropriate); the correct interpretation of any data link protocol and transmission rules; packing and unpacking data into message formats appropriate for the attached TDL 300; ensuring that the node 400 interfaces to the attached TDL 300 correctly and obeys the rules of the individual TDL; and the interface between the DLP and the Data Link Processor Adapter 410 is native to the DLP and is governed by its Interface Control Document and any applicable Data Link Standards.

The Data Link Processor Adapter (DLP-A) 410 acts as the "host" application for the DLP 310 and converts between a DLP Interface and a "normalised" network (i.e. the network in which communications between incompatible TDLs are mediated by a common protocol). The DLP-A converts the data received from the DLP 310 from its TDL-specific format into the normalised format and converts data received from the multi-link gateway 420 into the TDL-specific format.

The Multi Link Gateway (MLG) 420 is the heart of the node 400, in that it interfaces with a plurality of different TDL via a plurality of DLP-As 410. The MLG 420 creates a local "normalised" database 430 of all received information, i.e. all received information is stored in a format recognised by other MLGs 420 in the network. The MLG 420 also processes the received data according to forwarding rules, enabling information taken from one network, operator or the Federation Adapter 460 to be transmitted to any of the others. The MLG 420 also generates a situational awareness picture of all of the information it receives, both information received from the data link interface equipment 300 to which it is connected locally, and the information received from remote networks through the federation adapter 460.

In the event of loss of connectivity to other Federated Nodes 400', 400" the database 430 will continue to operate stand-alone using locally sourced information.

The federation adapter 460 creates a routing map of other federation adapters 460 on the network (regardless of whether they are connected on Secure IP or via some other direct connection). The federation adapter 460 also works out the routing table for message transport between federation adapters 460, for messages from source operator or Data Link Asset to alternative Data Link Asset or operator.

The federation adapter 460 also carries out IP network compression and optimisation algorithms on data transmissions between federation adapters 460, at the IP Protocol level; information compression algorithms at the Normalised Data level to ensure only the minimum information necessary is transmitted between nodes 400; nodal correlation to ensure nodes 400 seeing the same Data Link entities don't duplicate reports; and direct Command and Control messaging to local and remotely connected Data Link assets through the federation adapter mechanisms but without applying the filtering or reduction techniques.

In this example, the filtering is done in addition to the information compression at the normalised data level. The filtering selects the information being transmitted, on the basis of the update rate of the destination for non-critical information, the preferences of the source node (e.g. selections made by the operator), the geographic area, and the prevailing status (hostility, surface, subsurface, air etc.).

The multi-link gateway also connects to a web adapter 440, which provides a web browser interface for local web users 230. The web adapter 440 also retrieves map data from a map database 450 and provides it to the local web users 230. The users 230 are connected to the web adapter 440 via local copper IP network and access the database 430 generated locally by the MLG 420 from locally connected Data link interface equipment 300. The users 230 can also elect to receive information from other remote nodes 400, which is then retrieved via the Federation Adapter 460 and supplements the local data base 430.

Figure 6:
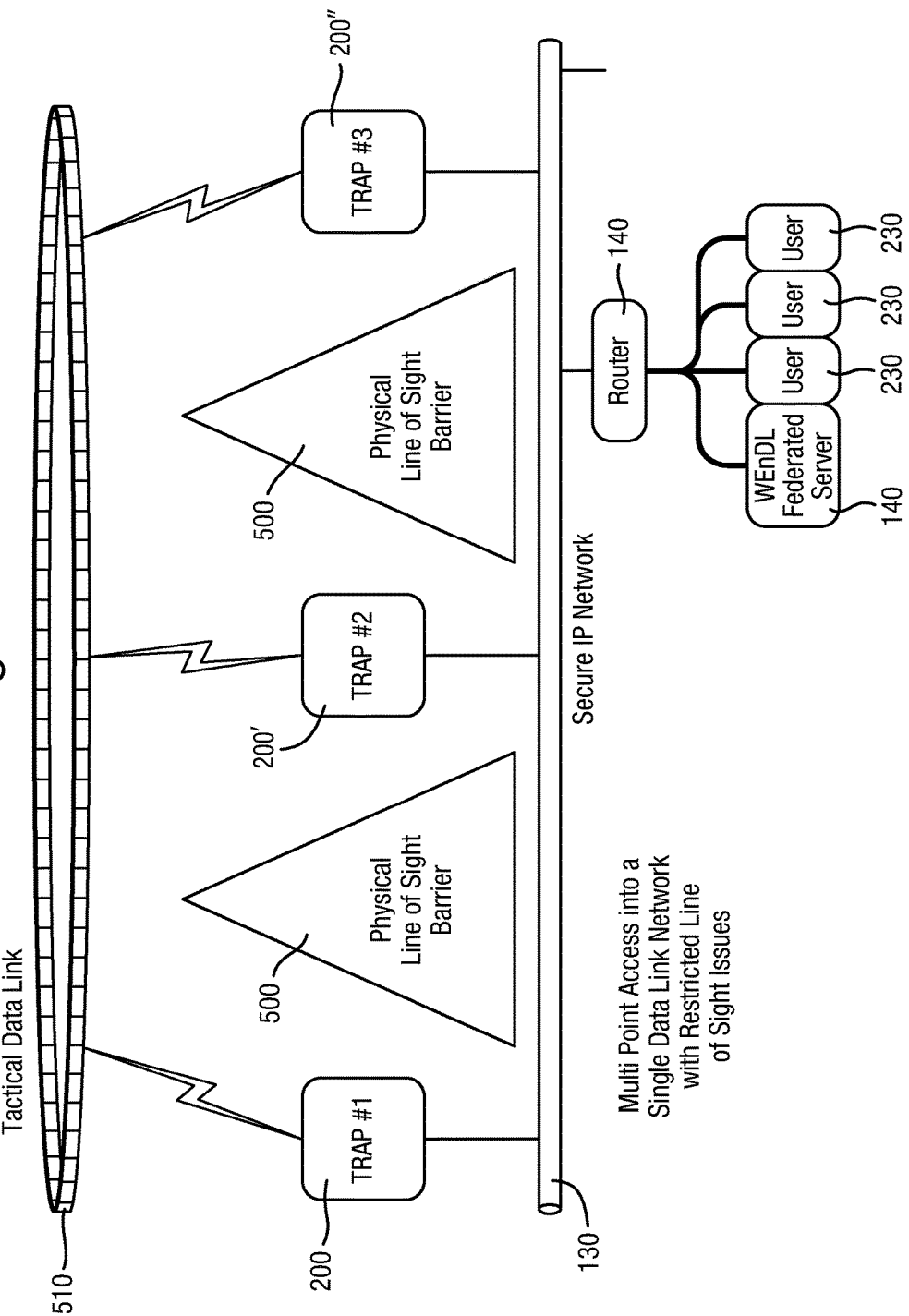
FIG. 6 is a schematic showing communications using a line-of-sight tactical data link in an area where there is no line of sight to a single TRAP in the system of FIG. 3.

A particular problem with some existing tactical networks is that assets within the network can communicate with each other only when a line-of-sight exists. Embodiments of the present invention can overcome that problem by enabling communication between separate TDLs. In general, one TRAP 200 is provided for each connected Data link 150. However, for example (FIG. 6) where a ground-based TRAP 200 cannot maintain Line of Sight connectivity to an asset due to physical obstacles 500, and a wider geographic connectivity is required, it is possible to connect several TRAP units 200, 200', 200" into a single Data link network 510 distributed geographically to provide beyond-line-of-sight connections. The TRAP units 200, 200', 200" are connected to the secure IP WAN 130 and their data is then fused and correlated in software into a virtual single nodal access point.

In example embodiments of the invention, users can use a single log-on identity but appear as operational units in a plurality of TDLs simultaneously. For example, in the secure network of FIG. 7, web users 230a and 230b are connected to a secure IP network 470 via a federated server 140, web users 230c and 230d are connected to the network 470 via a federated server 140'. Aircraft 230e is connected to a TDL 150, which is in turn connected to the network 470 via a TRAP 400, and aircraft 230f is connected to a TDL 150', which is in turn connected to the network 470 via a TRAP 400'.

User 230a is logged into the system via his web browser but is inserted into TDL 150 by the federated servers, thereby enabling the aircraft 230e, which is native to the TDL 150, to interact with the user 230a as if he were a link native entity. User 230d is logged into the system via his web browser but is inserted into both TDL 150 and TDL 150' by the federated servers, thereby enabling both aircraft 230e and aircraft 230f to interact with the user 230d as if he were a native entity in their respective TDLs 150, 150'. Thus, the system enables a user to simultaneously appear in different data link types or in physically isolated parts of the same network, e.g. where line-of-sight issues cause the assets to loose connectivity within a single TDL.

Similarly, an asset in one TDL can appear as a virtual instance in another TDL attached to the secure IP network, enabling the datalink native assets in the receiving networks to interact with the original asset as if it were a link native entity. That means that asset can simultaneously appear in TDLs of different types or in physically isolated parts of the same TDL, e.g. where Line of Sight issues cause loss of connectivity, as described above.

Figure 7:
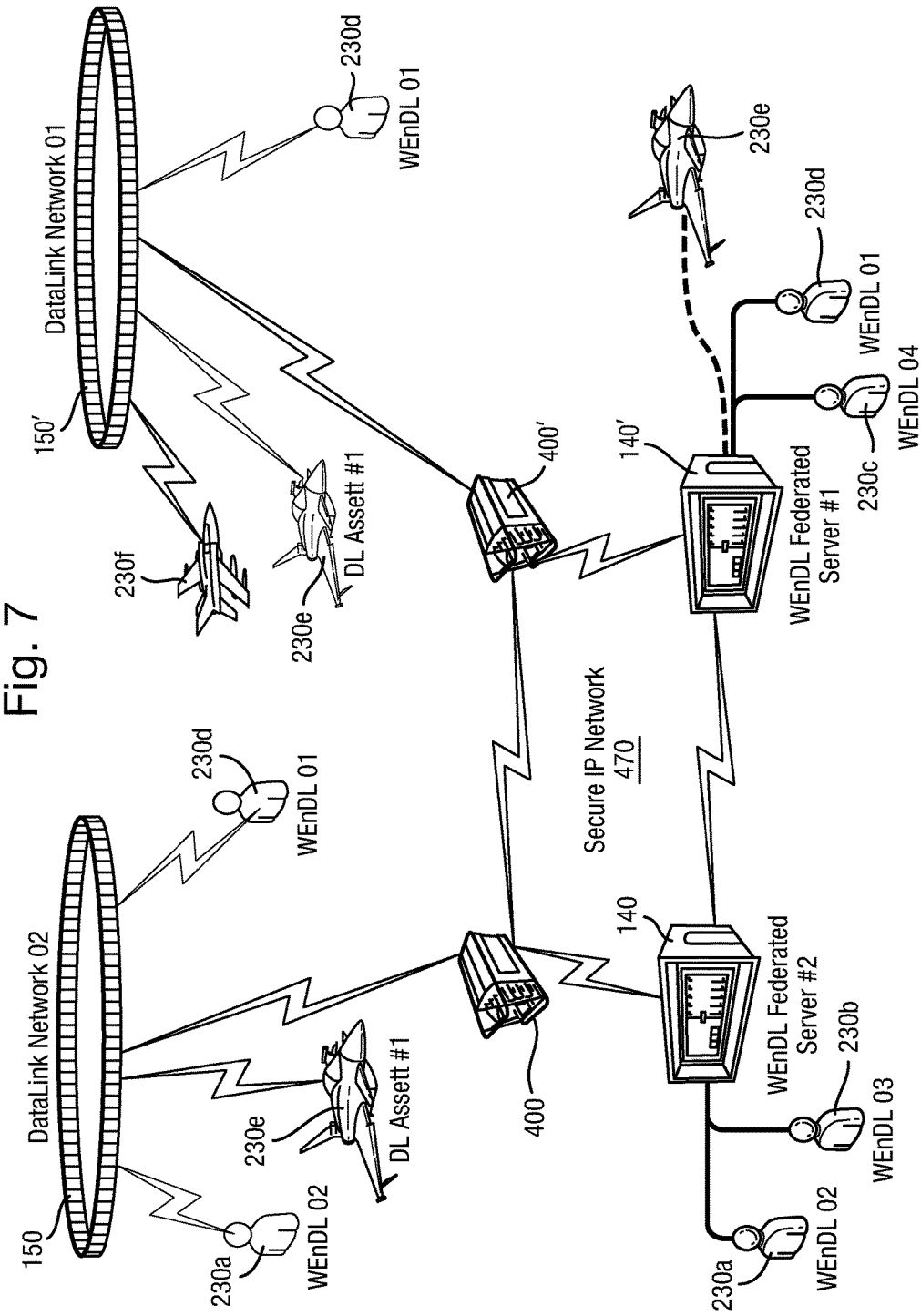
FIG. 7 is a schematic showing virtual instantiation of users and assets in the system of FIG. 3.

For example, in FIG. 7, aircraft 230e a native asset in TDL 150. It is virtually instantiated into TDL 150', where it is seen as a native participant in that network. As a result aircraft 230e is able to exchange information through its own TDL 150, across the secure network 470, and onto aircraft 230f in TDL 150' in the native DataLink format TDL 150'. The aircraft 230e can also appear as a virtual instance in the LAN of web users 230c, 230d, enable information to reach them from the aircraft 230e as IP data displayable on their web browsers.

While the present disclosure has been described and illustrated with reference to particular embodiments, it will be appreciated by those of ordinary skill in the art that the disclosure lends itself to many different variations not specifically illustrated herein.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

What is claimed is:

1. A tactical network comprising:
    a plurality of assets, at least some of the assets being grouped into sub-groups, the assets within each sub-group communicating with each other using a communication protocol,
    the sub-groups including:
        a first sub-group in which the assets all communicate with each other using a first communication protocol, and
        a second sub-group in which the assets all communicate with each other using a second communication protocol which is incompatible with the first communication protocol,
    each of the first and second sub-groups being associated with a respective first and second federated server,
    each of the first and second federated servers being configured:
        to receive data from the assets in the associated first or second sub-group,
        to assess the received data and identify significant changes therein,
        to convert the significant changes in the received data into a format that is common to all of the federated servers in the tactical network, and
        to transmit, in the common format, to the other of the first and second federated servers, the significant changes.

2. The tactical network as claimed in claim 1, in which the sub-groups include at least one sub-group that is an IP sub-group in which the communication protocol is Internet Protocol, and the assets in the IP sub-group include at least one user accessing the IP network using a web browser, so that web users are able to participate in tactical data link (TDL) networks.

3. The tactical network as claimed in claim 1, wherein the data received by each of the federated servers includes data relating to the status of the assets in the associated sub-group.

4. The tactical network as claimed in claim 1, wherein the data received by each of the first and second federated servers includes commands issued by or from an asset in the associated first or second sub-group and directed at an asset in the other of the first and second sub-groups.

5. The tactical network as claimed in claim 1, wherein the first and second federated servers provide information services to which assets can subscribe.

6. The tactical network as claimed in claim 1, wherein the data received by each of the first and second federated servers includes voice data.

7. The tactical network as claimed in claim 1, wherein:
    each of the first and second federated servers maintains a local copy of a common database, and
    the first and second federated servers exchange with each other data relating to changes in the content of the common database.

8. The tactical network as claimed in claim 1, wherein users can access the tactical network using a single log-on identity while appearing simultaneously as operational units in a plurality of the sub-groups.

9. The tactical network as claimed in claim 1, wherein each of the federated servers is configured to enable a user to simultaneously appear in different data link types or in physically isolated parts of the tactical network.

10. The tactical network as claimed in claim 1, wherein each of the federated servers gives priority to command messages.

11. The tactical network as claimed in claim 1, wherein:
    a plurality of the subgroups are linked to form a node of the tactical network, and
    the subgroups in the node are linked in a local area network (LAN).

12. The tactical network as claimed in claim 11, wherein:
    the LAN includes a node federated server with which the subgroups of the node are associated, and
    the node federated server communicates with the assets within the LAN over a higher-bandwidth connection than a wide area network connection over which it communicates with other federated servers.

13. The tactical network as claimed in claim 12, wherein communication within the LAN uses a protocol optimised for performance, whereas federated servers in different nodes communicate with each other using a protocol optimised to minimise traffic flow between nodes.

14. The tactical network as claimed in claim 11, wherein the local area network includes subgroup remote access points, which are tactical data links to LAN interface units, which enable the subgroups to exchange data with the LAN.

15. The tactical network as claimed in claim 11, wherein each of the federated servers acts as a command and control unit on the node(s) to which it belongs.

16. The tactical network as claimed in claim 11, wherein the LAN includes a federation adapter, said federation adapter being a software component responsible for exchange of data with other federated servers.

17. The tactical network as claimed in claim 11, wherein the LAN includes a physical TDL interface unit for providing an appropriate physical link to a particular TDL.

18. The tactical network as claimed in claim 17, wherein the LAN includes a data link processor, said data link processor being a controller, which manages physical control of and data exchanges with the physically linked TDL via the physical TDL interface unit.

19. The tactical network as claimed in claim 18, wherein the data link processor also receives location information from a Global Positioning System unit.

20. The tactical network as claimed in claim 18, wherein at least one of the federated servers includes a data link processor adapter which converts data from the data link processor into the common format used in communications between federated servers.

21. The tactical network as claimed in claim 11, wherein at least one of the federated servers includes a multi-link gateway connected to a plurality of TDLs.

22. The tactical network as claimed in claim 21, wherein the multilink gateway generates a situational awareness picture of all of the information it receives, both information received from data link processor(s) to which it is connected locally, and information received from remote subgroups.

23. The tactical network as claimed in claim 1, wherein at least one of the federated servers includes a federation adapter, which creates a routing table for message transport between federation adapters or for messages from an asset in one subgroup to an asset in another subgroup.

24. The tactical network as claimed in claim 23, wherein the federation adapter carries out network compression and optimisation algorithms on data transmissions between federation adapters.

25. The tactical network as claimed in claim 23, wherein the federation adapter carries out information compression algorithms at a normalised data level to ensure only the minimum information necessary is transmitted between federated servers.

26. The tactical network as claimed in claim 23, wherein at least one of the federation adapter carries out direct command and control messaging to local and remotely connected assets, without applying filtering or compression.

27. A method of communicating in a tactical network whereby an asset among a first plurality of assets in a first sub-group of the network communicates with an asset among a second plurality of assets in a second sub-group of the network, wherein all the assets in the first sub-group communicate with each other using a first communication protocol and all the assets in the second sub-group communicate with each other using a second communication protocol which is incompatible with the first communication protocol, the method comprising:
  the asset in the first sub-group transmitting data to a first federated server associated with the first subgroup;
  the first federated server assessing the transmitted data to identify significant changes therein;
  the first federated server converting the significant changes in the transmitted data into a format that is common to all federated servers in the tactical network; and
  the first federated server transmitting the significant changes, in the common format, to a second federated server that is associated with the second sub-group.

* * * * *